United States Patent [19]

Oates et al.

[11] Patent Number: 4,644,270

[45] Date of Patent: Feb. 17, 1987

[54] APPARATUS FOR MONITORING HOUSED TURBINE BLADING TO OBTAIN BLADING-TO-HOUSING DISTANCE

[75] Inventors: Robert M. Oates, Murrysville; Carlo F. Petronio, Ross Township; Mark G. Kraus, Churchill Boro, all of Pa.

[73] Assignee: Westinghouse Electric Corp., Pittsburgh, Pa.

[21] Appl. No.: 709,241

[22] Filed: Mar. 6, 1985

Related U.S. Application Data

[62] Division of Ser. No. 413,638, Aug. 31, 1982, Pat. No. 4,518,917.

[51] Int. Cl.[4] .................. G01B 7/14; G01H 11/00; G01R 19/04
[52] U.S. Cl. ................................. 324/207; 307/351; 324/103 P; 415/118
[58] Field of Search .............. 324/166, 173, 174, 207, 324/208, 226, 239, 102, 103 R, 103 P; 73/660, 661, 462; 307/351; 415/118

[56] References Cited

U.S. PATENT DOCUMENTS

| 2,805,677 | 9/1957 | Baird ............................ 324/207 X |
| 2,830,262 | 4/1958 | Lord ............................... 324/239 |
| 3,281,665 | 10/1966 | Foster et al. ................. 324/236 |
| 3,502,967 | 3/1970 | Bridges et al. ............... 324/226 |
| 3,593,133 | 7/1971 | Wisner ....................... 324/103 R |
| 3,597,963 | 8/1971 | Smejkal et al. .............. 73/660 |
| 3,743,934 | 7/1973 | Risch ........................... 324/226 X |
| 3,969,677 | 7/1976 | Woyton ...................... 324/166 X |
| 3,996,510 | 12/1976 | Guichard ................... 324/327 X |
| 4,153,388 | 5/1979 | Naegeli et al. ............ 415/118 X |
| 4,164,864 | 8/1979 | Feller ......................... 324/207 X |
| 4,213,085 | 7/1980 | Ramer ..................... 324/103 P X |
| 4,215,310 | 7/1980 | Schwerer ..................... 324/225 |
| 4,384,819 | 5/1983 | Baker ........................ 415/118 X |

FOREIGN PATENT DOCUMENTS

| 515912 | 8/1955 | Canada ....................... 324/103 P |
| 204463 | 12/1982 | Japan ......................... 324/103 P |

Primary Examiner—Gerard R. Strecker
Attorney, Agent, or Firm—D. Schron

[57] ABSTRACT

A plurality of proximity sensors are disposed in a turbine flow guide to measure flow guide-to-turbine blade tip distance at various points around the flow guide. The sensor signals are detected and the peak-to-peak voltage of the detected signals provides an indication of the desired distance measurement. The signals are also monitored and if ambient operating conditions causes the signals to exceed predetermined positive or negative thresholds, corrective signals are generated so as to bring the detected signal back into an acceptable range. A proximity sensor is also provided to measure axial movement of the rotor to which the blades are attached so that the other sensor signals can be modified as a function of the measured axial position.

5 Claims, 25 Drawing Figures

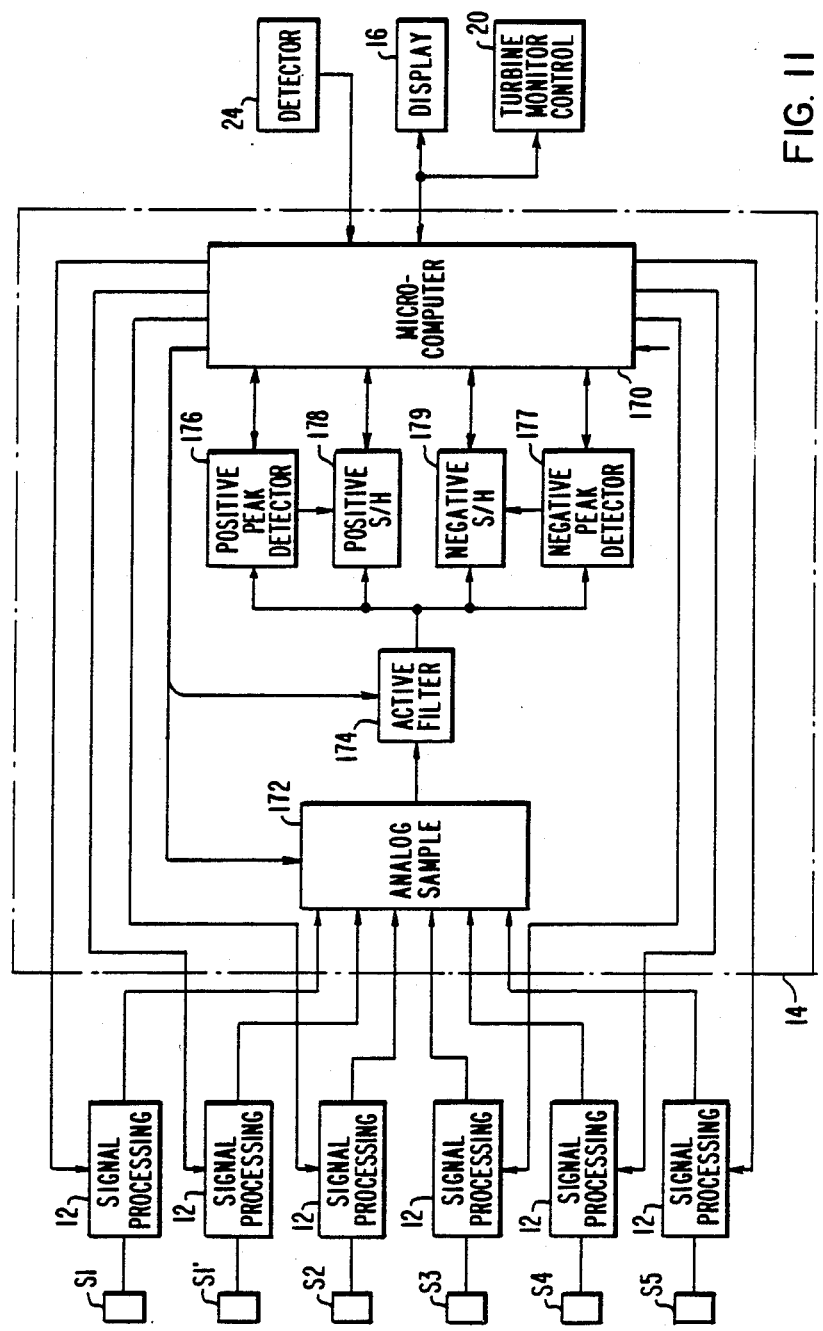

APPARATUS FOR MONITORING HOUSED TURBINE BLADING TO OBTAIN BLADING-TO-HOUSING DISTANCE

This is a division of application Ser. No. 413,638, filed Aug. 31, 1982, now U.S. Pat. No. 4,518,917.

BACKGROUND OF THE INVENTION

1. Field of the Invention

The invention in general relates to the monitoring of rotary machinery, and particularly to the monitoring of blading arrangements on turbines.

2. Description of the Prior Art

In order to reduce the unscheduled outages in turbine generator systems, and to prolong the life of the equipment, use is made of monitoring apparatus whereby abnormal operating conditions may be detected and remedied.

In such monitoring arrangements, it would be useful to know the distance between the turbine blading and its adjacent housing under operating conditions. Such information would not only provide an indication as to possible housing distortion but would also give clues to other possible sources of trouble such as turbine blade vibration, critical speed shaft vibration and a possibility of crack situations, by way of example.

In a multistage turbine, a selected blade row, generally the last, may be chosen for monitoring purposes and for obtaining blade-to-housing distance a plurality of housing-mounted proximity sensors may be provided. One type of sensor in common use is of the eddy-current type having a certain impedance which changes in response to the sensor's proximity to a conducting member. The sensor includes an AC excited coil, the inductance and resistance of which change as the coil is brought in close proximity to a metallic object. Since the coil's inductance and resistance would also change in response to temperature-induced electrical conductivity and magnetic permeability changes, many sensors include dual coils utilizing a particular bridge arrangement to nullify the effect of temperature-induced coil impedance changes so that the sensor output signal is free of any signal component which is non-proximity related.

A problem arises, however, in that in the operating environment of a turbine, tremendous variations in temperature occur, the effects of which may be difficult or inconvenient to null due to instrument inaccessability or the requirement for virtually constant recalibration, for example. Since the sensor output signals are critical in the monitoring of a multi-million dollar machine, it is imperative that the signals be as highly accurate as possible.

The present invention fills the need for a highly accurate turbine blading monitoring system.

SUMMARY OF THE INVENTION

The turbine blading monitoring apparatus of the present invention includes a plurality of sensors of the type having a certain impedance which changes in accordance with the sensors' proximity relative to a conducting member. The sensors are positioned around the periphery of the turbine blading at respective positions with each sensor providing an output signal indicative of turbine blade proximity. Each sensor signal, however, may include an undesired component which is not related to proximity, but which may be due, for example, to turbine temperature extremes. Circuit means are provided for processing the output signals from the sensors for generating respective detected sensor signals and a control means derives proximity indications in response to these detected signals. Corrective circuit means are provided for generating balancing signals and combining them with the sensor output signals so as to eliminate or minimize the effects of the undesired component of the signals. The balancing may be accomplished in response to the detected signals exceeding a predetermined positive or negative voltage threshold.

In a preferred embodiment, the sensors' signals are broken down into respective in-phase and quadrature components which are separately detected, and respective in-phase and quadrature corrective signals are generated when needed.

To provide for more accurate readings, a sensor is positioned to measure movement of the blades in a direction parallel to the turbine rotor axis so that the readings from the other sensors may be modified accordingly.

BRIEF DESCRIPTION OF THE DRAWINGS

FIG. 11 is a block diagram illustrating the central control of FIG. 1 in more detail;

DESCRIPTION OF THE PREFERRED EMBODIMENT

Figure 1:
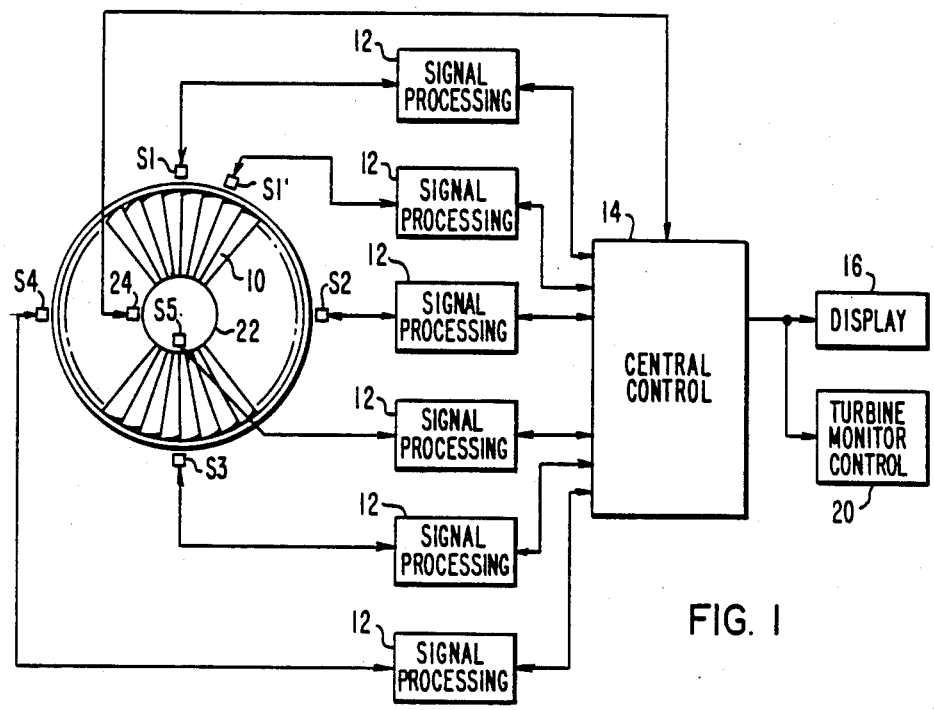
FIG. 1 is an overall block diagram illustrating a monitoring system in accordance with the present invention.

Referring now to FIG. 1, there is illustrated a turbine blading monitoring system which includes a plurality of sensors S1 to S4 positioned adjacent turbine blading 10 at respective positions around the periphery thereof. If desired, one or more of the sensors may have a redundant counterpart such as sensor S1' operative as a back-up for sensor S1.

The sensors' output signals are provided to respective signal processing circuits 12 which function to generate highly accurate demodulated sensor signals. These demodulated sensor signals are received by the central control 14 which includes a microcomputer and which is operable to compute the desired results from the data received and provide such results to the display 16. If desired, such results may also be provided to a turbine monitor and/or control system 20.

In the high temperature environment of a turbine, and due to the expansion of metal members, the shaft 22 to which blading 10 is connected is subject to axial movement. In order to provide for a more accurate system, sensor S5 is included so that an axial indication of the blading position 10 relative to sensors S1 to S4 may be obtained so that their output signals may be modified accordingly. The signal processing circuitry for sensor S5 may be identical to the signal processing circuits 12 for the other sensors.

During operation of the monitoring system, it is necessary to know which blade passes a chosen sensor at a particular point in time. Such apparatus for making this determination is well known in the turbine art, and one method by way of example includes the use of a detector such as detector 24 positioned to provide an output reference signal for each 360° of rotation of the blading 10. With this information, central control 14 can keep a running count of the turbine blades during their rotation and additionally obtain an indication of the rotational speed of the turbine.

Figure 2:
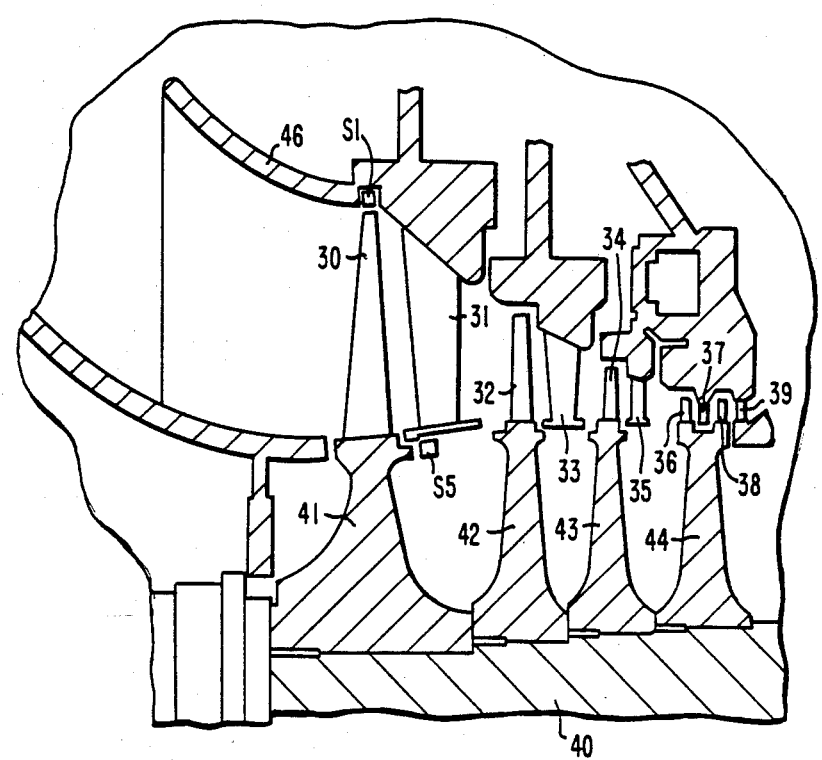
FIG. 2 is a cross-sectional view of a portion of a steam turbine in which the present invention may be utilized.

Although the system is applicable to a variety of rotating blade structures, it will be described by way of example with respect to the monitoring of the last blade stage in a low pressure steam turbine, a portion of which is illustrated in FIG. 2.

The turbine includes a plurality of turbine blades 30 to 39 with the even-numbered blades being connected to rotor 40 by means of rotor discs 41 through 44. The even-numbered blades extend symmetrically about the rotor in respective blade rows and are termed rotor blades. The odd-numbered blades are connected to, and extend around, an inner turbine cylinder and are stationary blades.

In a typical operation, superheated dry steam enters the first stage (constituted by blades 38 and 39) and passes through subsequent stages where expansion and temperature and pressure changes take place. Steam exits the last stage (constituted by blades 30 and 31) via a flow guide 46.

Blade 30 as well as all of the other blades in that blade row, are free-standing blades and the sensors are positioned in apertures machined in the flow guide so as to be adjacent the tips of the blade. FIG. 2 illustrates a typical sensor, S1, so positioned. Sensor S5 is provided for measuring axial movement of the rotor and accordingly will serve this purpose if mounted where illustrated, adjacent disc 41. One type of sensor which can withstand the rigors of the interior of the steam turbine is described and claimed in copending application Ser. No. 403,431 filed July 30, 1982 and assigned to the same assignee as the present invention.

Figure 3:
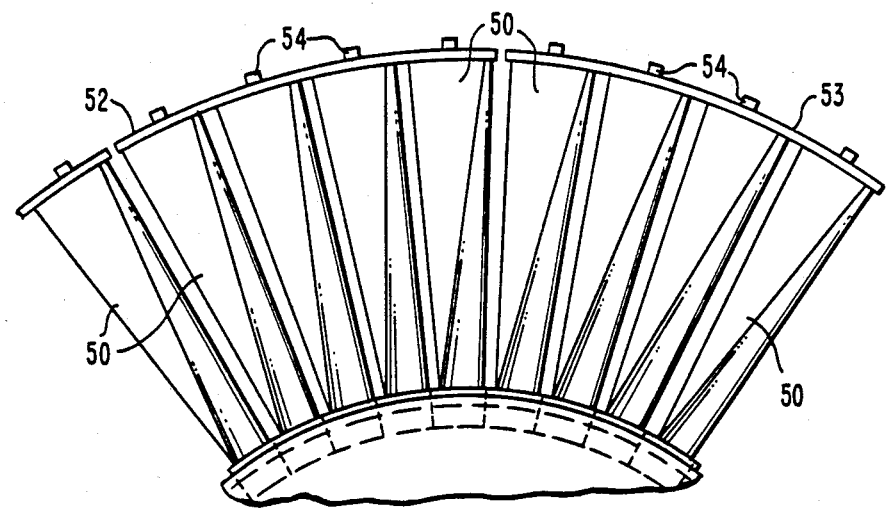
FIG. 3 illustrates a turbine shrouded blading arrangement.
Figure 10:
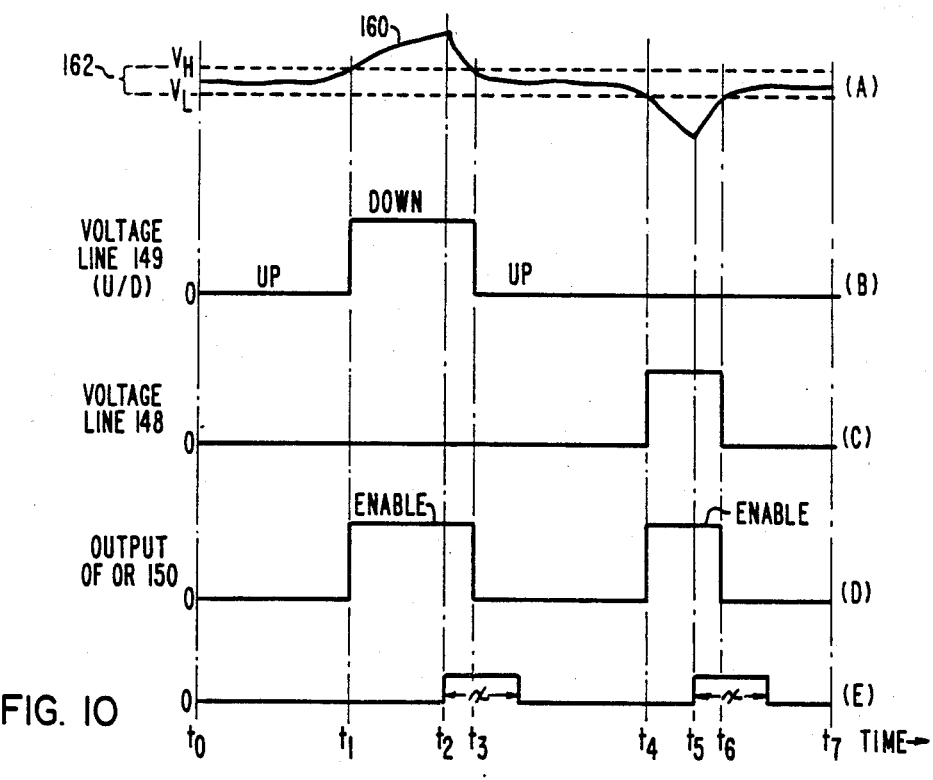
FIGS. 10A through 10E are waveforms to aid in an understanding of the operation of the auto-balance circuit of FIG. 7.

Although the blading being monitored in FIG. 2 is of the free-standing type, the invention is additionally applicable to shrouded blading such as illustrated in FIG. 3. In a shrouded arrangement, the blades 50 are divided into shroud groups with the blade tips of each group being secured to a shroud piece such as 52 and 53. The blade tips may be riveted to the shroud pieces and the rivets 54 (or other added markings) may be detected by the plurality of radially disposed sensors.

Referring back to FIG. 2, the flow guide 46 is circular in an axial cross-section, such that the blade tips form a small gap with the flow guide 46, with the gap distance in normal operation being constant for 360° C. around the flow guide. One application of the present invention is to measure the gap distance at the plurality of sensor locations. Since the distance readings should be identical, any deviation will provide an indication of distortion or ovality that the turbine flow guide acquires under different operating conditions. In addition, deviation in readings may also provide indications of shaft vibration. If a shrouded arrangement is used such as illustrated in FIG. 3, the monitoring system herein can also provide indications of loose shroud pieces.

Figure 4:
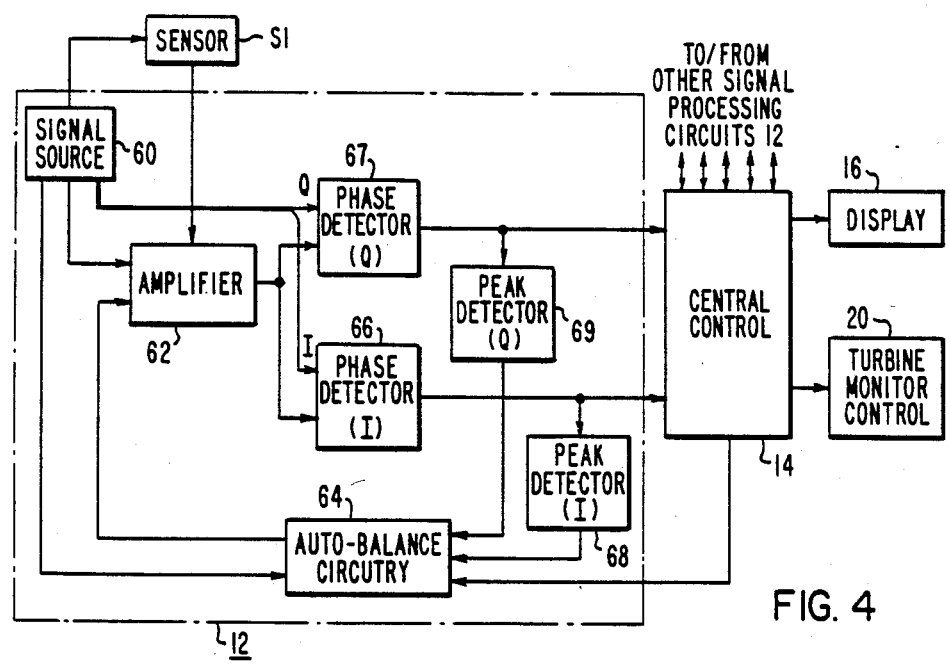
FIG. 4 is a block diagram illustrating a signal processing circuit of FIG. 1 in more detail.

The functional block diagram of FIG. 4 illustrates a typical signal processing circuit 12 in somewhat more detail. The signal source 60 is provided and as one of its functions supplies a high frequency signal to the sensor such as S1 which may be of the eddy-current variety. As the turbine blades pass the sensor, it provides an output signal to amplifier 62 and since the sensor output signal is subject to error, corrective signals are supplied to amplifier 62 by the signal source 60, as well as by an auto-balance circuit 64.

As is well known, any AC signal can be resolved into in-phase (I) and quadrature (Q) components. The signal processing circuit is operable to detect these in-phase and quadrature components and for this purpose, phase detectors 66 and 67 are provided, with each of these detectors receiving a respective I and Q reference signal from the signal source 60. Unit 66 and 67 may be identical synchronous demodulators, well known to those skilled in the art. The outputs of phase detectors 66 and 67 represent the detected I and Q components of the sensor signal.

In addition to being provided to the central control 14 for further signal processing, these detected signals are also provided to respective peak detectors 68 and 69 each of which outputs a nominally DC voltage representing the envelope of the peaks of the signal applied to it. The peak detected signals from units 68 and 69 are provided to the auto-balance circuit 64 where they are used in the generation of corrective signals, as will be explained.

Figure 5:
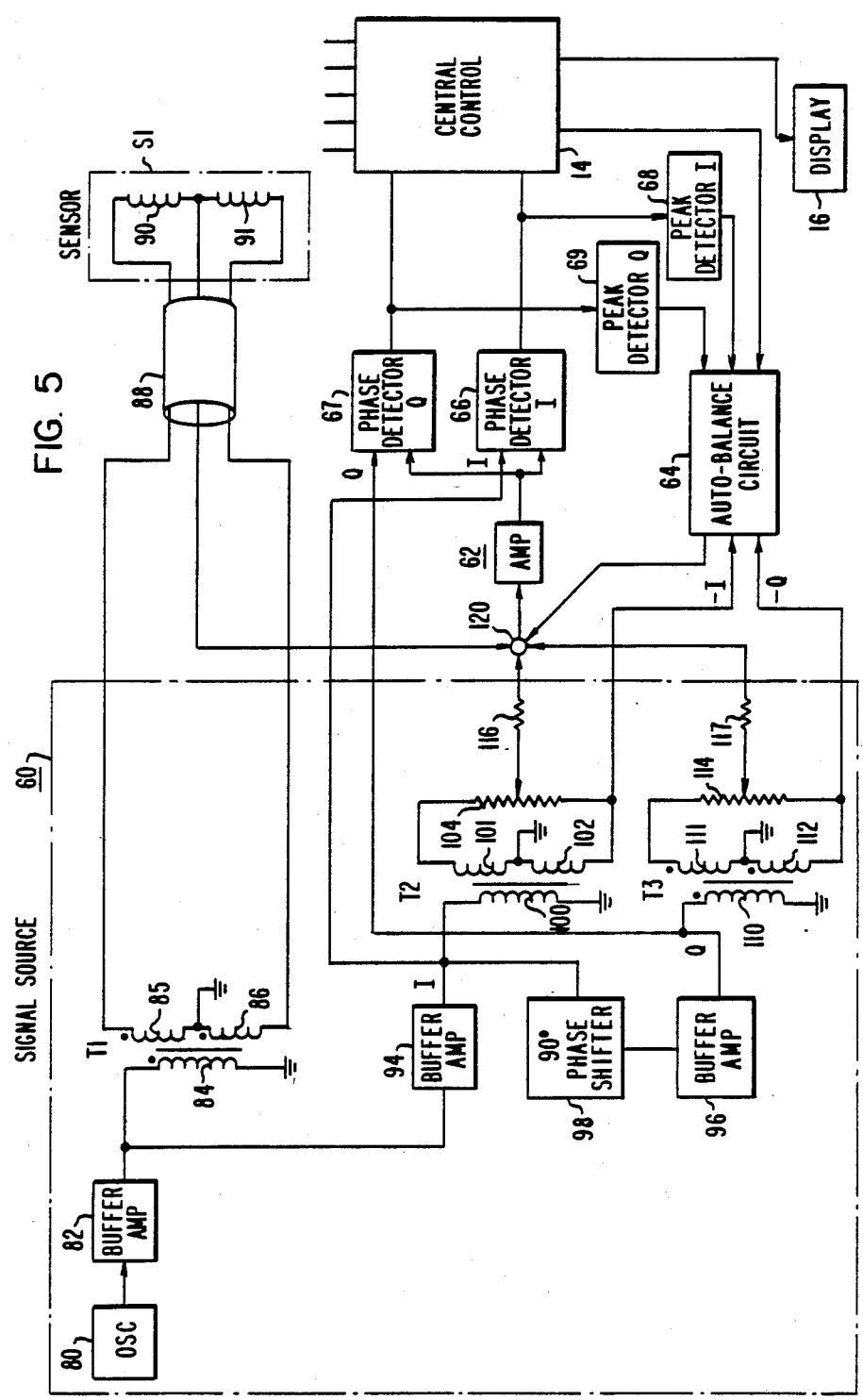
FIG. 5 illustrates the signal source of FIG. 4 in more detail.

FIG. 5 duplicates FIG. 4 with a more detailed showing of the signal source 60 and sensor S1. Oscillator 80 of signal source 60 applies a high frequency signal, for example, one megahertz, through buffer amplifier 82 to the primary winding 84 of a trifilar wound transformer T1 having secondaries 85 and 86 connected in a center-tapped configuration with the center tap being grounded. The other two leads of windings 85 and 86 are connected to sensor S1 by means of a three-conductor shielded cable 88.

The sensor S1 includes a first winding 90 and a second winding 91 utilized for temperature compensation, with the junction between the coils providing the sensor output signal to amplifier 62. Under certain ideal operating conditions, the utilization of winding 91 in the bridge arrangement is adequate for nullifying the effect of temperature-induced coil impedance changes. In the hostile environment of the steam turbine, however, the temperature variations are too extreme such that the sensor's output signal which is modulated by the passage of the turbine blades includes a desired component related to blade proximity as well as an undesired component which is not related to proximity and which generally cannot be cancelled out by a simple dual coil temperature compensating arrangement, without a constant manual rebalancing. In the present invention, the sensor output signal is automatically corrected to nullify and substantially reduce this undesired component.

As was stated, the sensor output signal is separated into I and Q components which are detected by phase detectors 66 and 67 provided with I and Q reference signals for the demodulation process. These I and Q signals are provided by buffer amplifiers 94 and 96 with buffer amplifier 94 being connected to receive the oscillator output through buffer amplifier 82 to provide the I reference signal and with buffer amplifier 96 being connected to receive the signal after a 90° phase shift by phase shifter 98 so as to provide the Q reference signal.

The I reference signal from buffer amplifier 94 is applied to the primary winding 100 of a trifilar wound transformer T2 having secondary windings 101 and 102 connected in a grounded center-tapped configuration with the other ends of the windings being connected to respective ends of potentiometer 104.

In a similar fashion, the Q reference signal supplied by buffer amplifier 96 is provided to the primary winding 110 of trifilar wound transformer T3 having secondaries 111 and 112 connected in a grounded center-tapped configuration with the other ends thereof being connected to opposite ends of potentiometer 114.

The wiper arms of potentiometers 104 and 114 are connected through respective series resistors 116 and 117 to a summing junction 120 of amplifier 62, and to which summing junction is applied the output signal from sensor S1 as well as a corrective signal from auto-balance circuit 64. The wiper arms of the potentiometers may be moved manually to provide for an initial correction of the sensor signal while the auto-balance circuit 64 synthesizes a corrective signal to provide for the dynamic correction. In the generation of this dynamic correction signal, auto-balance 64 utilizes I and Q reference signals obtained from the signal source 60, such as derived from the ungrounded end of windings 102 and 112 of transformers T2 and T3. The operation of the circuitry of FIG. 5 and the cancellation of the undesired component of the sensor signal may be explained with reference to FIGS. 6A through 6C.

Figure 6A:
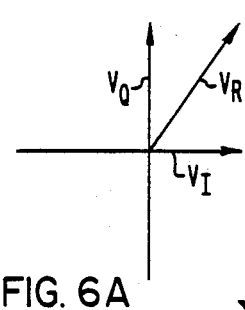
FIGS. 6A through 6C are vector diagrams illustrating certain voltages that are generated herein.

In FIG. 6A, the arrow $V_R$ is the vector representation of a sinusodial signal. As is well known, vector $V_R$ may be broken down into two mutually perpendicular components illustrated as $V_I$ and $V_Q$ representing the in-phase and quadrature components, respectively. As the magnitude and phase of $V_R$ changes, so will the respective amplitudes of $V_I$ and $V_Q$.

Figure 6B:
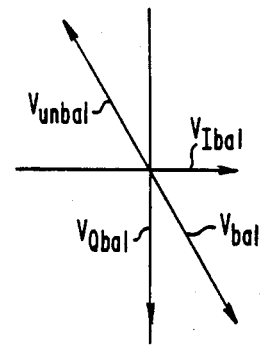

In a typical dual coil arrangement wherein one coil is located behind the other, the coils do not experience the exact same environment and accordingly, one coil is more affected by changes in temperature than the other. As temperature varies, coil and surrounding material permeability and conductivity change, thereby changing the coil impedance. In FIG. 6B, vector $V_{unbal}$ represents an unbalance voltage which may be generated by the sensor at room temperature due to its environmental location, as opposed to being caused by the proximity of a turbine blade. In the arrangement of FIG. 5, an equal and opposite voltage designated by vector $V_{bal}$ is added to the sensor output signal to cancel the unbalance. Vector $V_{bal}$ is made up of in-phase and quadrature components $V_{Ibal}$ and $V_{Qbal}$ with $V_{Ibal}$ being provided to summing junction 120 by manual adjustment of potentiometer 104 and $V_{Qbal}$ being supplied to summing junction 120 by manual adjustment of potentiometer 114.

Figure 6C:
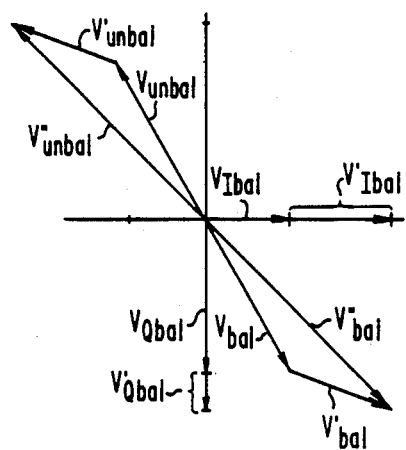

When the turbine is in operation, and extremely high temperatures are encountered, a further and dynamic unbalance is created in the sensor's output signal. This situation is depicted in FIG. 6C which illustrates the vectors of FIG. 6B and adds to it the dynamic unbalancing as represented by vector $V'_{unbal}$ with the resulting unbalance being designated $V''_{unbal}$. An equal and opposite signal $V'''_{bal}$ is generated to nullify or minimize the effects of the unbalance component. $V''_{bal}$ may be considered to be made up of $V_{bal}$ and a second balancing component $V'_{bal}$. The $V_{bal}$ component as previously described in FIG. 6B is selected manually. The $V'_{bal}$ component is provided by the auto-balance circuit 64 by combining in-phase and quadrature components $V'_{Ibal}$ and $V'_{Qbal}$, the generation of which is described in FIG. 7 to which reference is now made.

Figure 7:
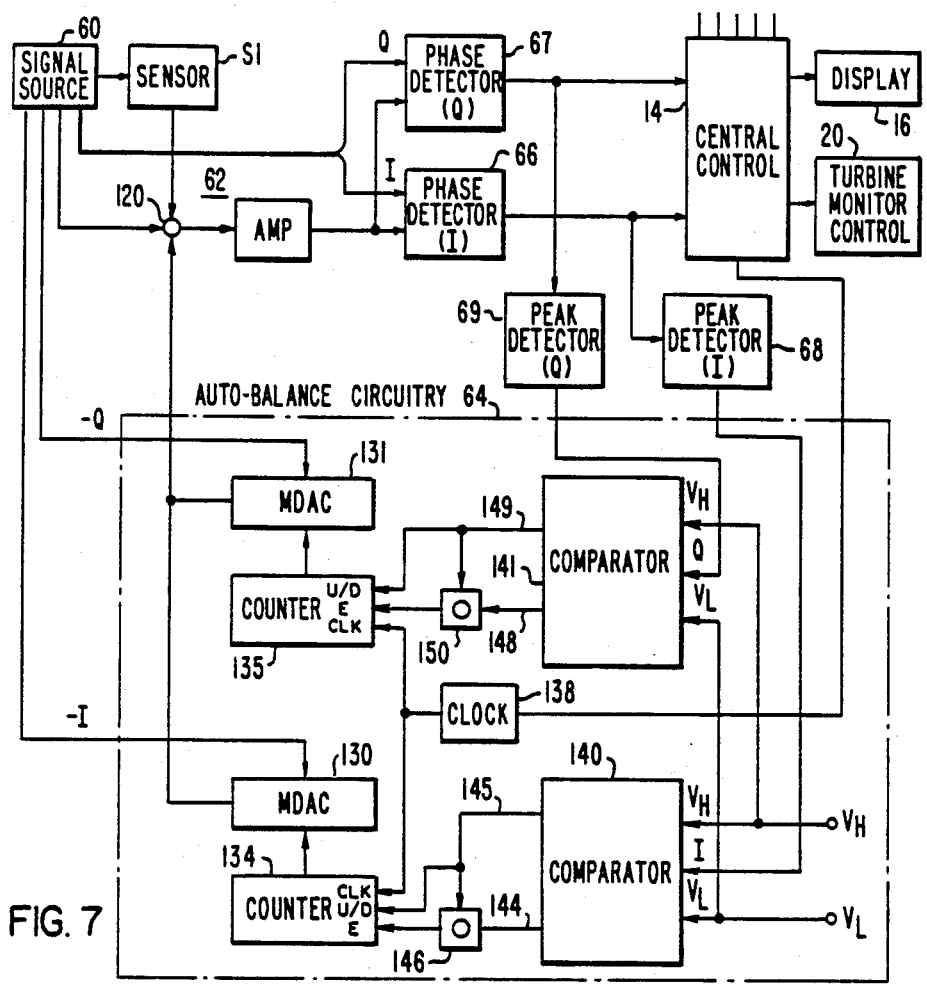
FIG. 7 is a block diagram illustrating the auto-balance circuit of FIG. 4 in more detail.

FIG. 7 duplicates FIG. 4 with a more detailed showing of the auto-balance circuit 64. The circuit in one embodiment includes a multiplying digital-to-analog converter (MDAC) 130 used in the generation of a corrective or balancing I signal and a second MDAC 131 used in the generation of a correcting Q signal. In addition to the I and Q reference signals provided by signal source 60, each MDAC receives the output of a respective counter 134 and 135. The counters are driven by a constant freqency clock 138 when it is enabled by a command from the central control 14.

The enabling of the counters and the up or down (U/D) counting direction are governed by respective dual limit comparators 140 and 141. Comparator 140 compares the value of the I peak detected signal from peak detector 68 with high and low limits $V_H$ and $V_L$. As long as the I peak detected signal lies within the band, or window, defined by the upper and lower limits, $V_H$ and $V_L$, then counter 134 remains disabled. If either the high or low limit is exceeded, appropriate logic signals will be provided on output leads 144 and 145 to cause enabling of the counter 134 through OR gate 146, with the signal on lead 145 defining the up or down counting direction.

In a similar fashion, comparator 141 will provide appropriate logic signals on output leads 148 and 149 if the value of the Q peak detected signal from peak detector 69 exceeds the high or low limits $V_H$ and $V_L$. Enabling of counter 135 is performed by the appropriate output signal being provided to OR gate 150 with the up or down counting direction being governed by the signal on lead 149.

Figure 8A:
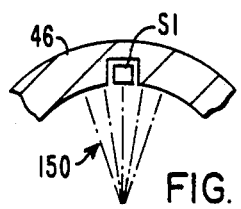
FIGS. 8A and 8B illustrate the positioning of a typical sensor with respect to turbine blades.

A typical comparator operation may be better understood with additional reference to FIGS. 8A through 10E. In FIG. 8A, sensor S1 is shown nestled in the turbine flow guide 46 whereby the turbine blades consecutively pass under the sensor. The series of dot-dash lines 150 represent the axes of the blades passing under the sensor and it is seen in FIG. 8A that a turbine blade is directly under the sensor thus resulting in a maximum output signal. In FIG. 8B, a sensor is between blades and would thereby provide a minimum output signal.

Figure 8B:
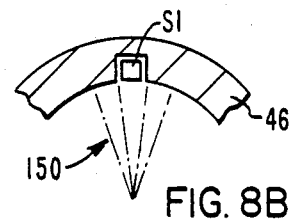

In accordance with well known circuit design practice, the phase detector (66 or 67) is of the type which provides a differential or balanced output. Waveform 152 of FIG. 9 illustrates the detected sensor signal as it appears at one of the outputs and as presented, the sharper negative peaks designated with the even voltages $V_2$, $V_4$, $V_6$, etc. result from successive individual blades being directly below the sensor as depicted in FIG. 8A whereas the somewhat flatter positive peaks designated with the odd voltages $V_1$, $V_3$, $V_5$, etc. result from successive spaces being presented underneath the sensor as depicted in FIG. 8B.

The positive to negative peak-to-peak voltages of waveform 152 are related to respective sensor-to-blade distances. In the present invention, the peak-to-peak voltage attributable to a particular blade is derived by taking an average of the positive peak signal immediately before and immediately after the negative peak signal caused by the blade and thereafter subtracting that negative peak voltage. More particularly, if V is the peak signal and n is an odd integer, then the peak-to-peak derived signal is:

$$(V_n + V_{n+2})/2 - V_{n+1} \tag{1}$$

Figure 9:
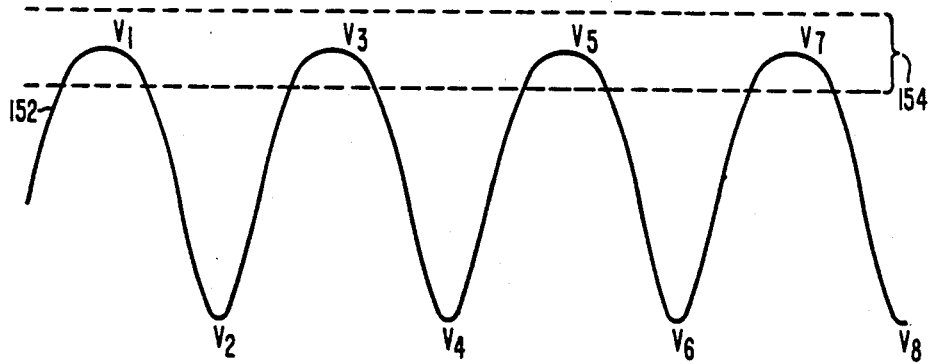
FIG. 9 is a waveform of a typical detected sensor signal.

During normal turbine operations, the waveform of FIG. 9 may typically rise and fall with temperature variations. As long as there is no change in sensor-to-blade distance, the peak-to-peak values will not vary during the positive and/or negative drift of the waveform, and accordingly accurate output signals will be provided. If the waveform, however, drifts beyond acceptable limits, signal processing circuitry may become saturated, thus distorting the true peak-to-peak values and thereby resulting in an erroneous output. Accordingly, in one embodiment of the present invention, the central control is operative to monitor the waveform 152 to determine whether the positive peaks thereof drift outside of a predetermined range window 154 so as to initiate corrective action by the auto-balance circuit 64 of FIG. 7. This operation may be described with additional reference to FIGS. 10A through 10E.

Waveform 160 of FIG. 10A represents the output of one of the peak detectors, for example, peak detector 69. Waveform 160, therefore, is the line which essentially connects the peaks $V_1$, $V_3$ and the subsequent positive peaks of the Q signal waveform for multiple rotations of the turbine blading within the time period $t_0$ to $t_7$.

$V_H$ and $V_L$ of FIG. 10A are the high and low voltage limits applied to comparator 141 (as well as comparator 140) and it is seen that between times $t_0$ and $t_1$, waveform 160 remains in the window 162 between the high and low voltage values. During this period of time, the voltage level on line 149 (FIG. 7) assumes a zero logical state as does the voltage level on line 148, as illustrated in FIGS. 10B and 10C, respectively. Therefore, from $t_0$ to $t_1$, counter 135 is primed to count up, however, it is not enabled to do so nor are there clock pulses being provided by clock 138.

At time $t_1$, the Q peak detected signal exceeds the high limit defined by voltage $V_H$ to cause a logic one output on line 149, as seen in FIG. 10B, the presence of which causes a logical one output from OR gate 150, as seen in FIG. 10D. Counter 135 is now primed to count down and is enabled to do so, however, no clock pulses are yet provided by clock 138. Let it be assumed that the Q waveform such as illustrated in FIG. 9 continues its upward drift until the central control has determined that the detected sensor signal is outside of its normal range. As such time, the central control will supply an enabling signal, as illustrated in FIG. 10E, so as to cause clock 138 to provide its output clock signal whereupon counter 135 in conjunction with the operation of MDAC 131 will cause a reduction in the magnitude of the Q signal by reducing the value of signal applied to summing junction 120. This reduction is initiated at time $t_2$ and although the enabling signal to clock 138 is provided for a period of time equal to X, the corrective action brings the peak signal down to an acceptable range at time $t_3$ at which point the voltage on line 149 reverts to a zero logic condition, as does the output of OR gate 150, thereby disabling counter 135 even though clock pulses are still being applied to it.

According to FIG. 10A, the peak signal is maintained within an acceptable range up until time $t_4$ where waveform 160 becomes less than the lower limit $V_L$ thus causing an output logical one signal on line 148 with a resulting logical one output from OR gate 150 to enable the counter. At time $t_5$, the central control will provide an enabling signal to clock 138 such that counter 135 will count up to cause the addition of a corrective signal to summing junction 120. The counter will stop its counting function at time $t_6$ when the corrective action has again brought back the waveform into acceptable limits.

Comparator 140 of FIG. 7 operates in an identical manner to that of comparator 141 except that the I peak signal from peak detector 68 is monitored and although the peak waveform may be of a different voltage value than that of waveform 160, the operation is identical in that if the threshold values of window 162 are crossed, counter 134 and MDAC 130 function to provide a corrective I signal to summing junction 120. The corrective signals provided by MDAC 130 and 131 therefore are the respective signals $V'_{Ibal}$ and $V'_{Qbal}$ described in FIG. 6C and the combination of which results in a corrective voltage $V'_{bal}$ equal in magnitude but opposite in phase to the unbalanced voltage $V'_{unbal}$.

The computation of the peak-to-peak signals and the generation of data for display and/or control purposes is accomplished by the central control 14, further details of which are illustrated in FIG. 11. The central control 14 includes a computer means, the function of which may be carried out by a microcomputer 170 which receives the once per revolution signal from detector 24 to compute therefrom an RPM speed signal for display and control purposes. The blades in the blade row being monitored are consecutively numbered and with the provision of the once per revolution signal together with the computed RPM value, the microcomputer is able to keep track of the instantaneous location of any one of the blades designated as the reference blade, for example, blade number 1. As was stated, other means for keeping track of the blades such as a device for providing a once per blade signal may also be utilized.

The microcomputer controls an analog sampling switch 172 operable to selectively sample the outputs of the signal processing circuits 12. For example, let it be assumed that sensor S1 (or S1') is to be sampled first beginning with blade number one and continuing for a complete revolution of all the blades. In order to reduce high-frequency noise and spikes, a low pass filter 174 is utilized to filter the signal passed by the sampling switch 172. In a preferred embodiment, this filter is of the active type capable of varying its filter characteristics as dictated by microcomputer 170 and in accordance with a particular turbine speed or speed range.

The processed and filtered sensor signal is then simultaneously provided to positive and negative peak detectors 176 and 177 as well as positive and negative sample and hold circuits 178 and 179. When a positive signal peak is attained, positive peak detector 176 will so indicate to the microcomputer and the positive sample and hold circuit 178 will provide the value of this peak signal to the microcomputer. Negative peak detector 177 in conjunction with negative sample and hold circuit 179 function in an identical manner with respect to the negative peaks of the signal. The peak signals corresponding to voltage values $V_1$, $V_2$, $V_3$... etc. (see FIG. 9) are converted to digital form in microcomputer 170 and placed into appropriate memory locations. If desired, and depending upon microcomputer operating speed, the peak-to-peak signals for all of the turbine blades passing sensor S1 may be computed or alternatively, such computation may be held in abeyance until data from the remaining sensors have been processed and stored.

During the storage process, the microcomputer is operable to examine the positive peak signals and provide an enabling signal to clock 138 (FIG. 7) of autobalance circuit 64 if the peak signals drift out of the range window 154 discussed with respect to FIG. 9.

The phase detectors 66 and 67 of a typical signal processing circuit 12 provide respective I and Q detected sensor signals and although both may be utilized for generating corrective signals, only one need be utilized in the computation of peak-to-peak voltages for distance determination. In general, if the turbine blades are of a magnetic material such as steel, then the Q component of the sensor signal would have a greater peak-to-peak value than would the I component and would therefore present a greater dynamic range and allow for a more accurate system. The reverse would be true for a nonmagnetic blade such as titanium in which case selection of the I component for peak-to-peak values would be dictated.

Even though a sensor's distance to a blade tip remains constant, the peak-to-peak value of the detected sensor signal may vary depending upon the sensor's location between the leading and trailing edges of the blade. Since the rotor may be subject to axial movement and since the blade is connected to the rotor, the position of the sensor relative to the blade's leading and trailing edges may vary and in so doing, may provide different peak-to-peak signals even though the actual sensor-to-blade tip distance does not vary.

Figure 12A:
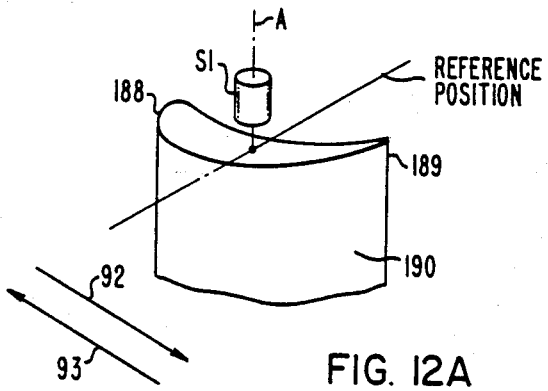
FIGS. 12A through 12C illustrate the relative positioning of a sensor with respect to a turbine blade tip.

For example, FIG. 12A illustrates a situation wherein a sensor S1 is positioned relative to the leading and trailing edges 188 and 189 of turbine blade 190 such that the sensor's central axis A is directly over a reference position at some arbitrary point between the blade's leading and trailing edges. Axial movement of the disc, and therefore the blade, is designated by arrows 92 and 93.

Figure 12B:
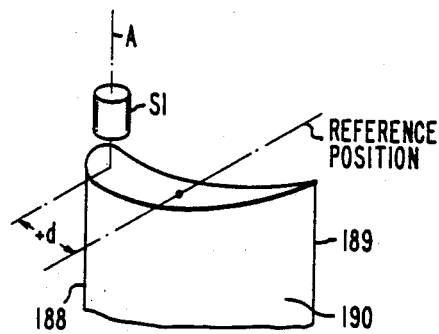

Movement in the direction of arrow 92 to one extreme will bring the sensor close to the leading edge 188 as depicted in FIG. 12B. This position is displaced at a distance +d from the reference position; however, since the mass of metal encountered by the sensor is somewhat similar to that encountered at the reference position, the peak-to-peak distance indicative signals for the situation of 12B will be only slightly different from those produced when the sensor is at the reference position as in FIG. 12A.

Figure 12C:
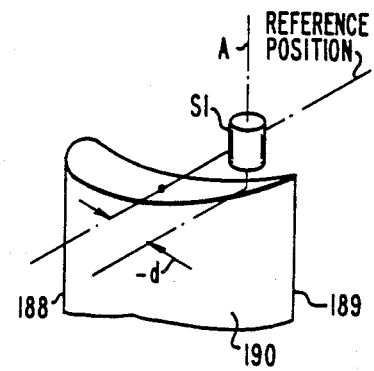

With extreme movement in the direction of arrow 93, the sensor is displaced at a distance −d from the reference position, near the trailing edge 189 as illustrated in FIG. 12C. At this location, the mass of metal encountered by the sensor is less than the other two positions and accordingly, the peak-to-peak signals generated will be of smaller magnitude for the same sensor to blade distance.

If the peak-to-peak sensor signal varies therefore, it is not known whether the variation is due to axial movement or change in sensor-to-blade distance. Accordingly, the monitoring system of the present invention includes means for determining this axial movement so as to modify the peak-to-peak derived values to provide for more accurate output readings.

Figure 13:
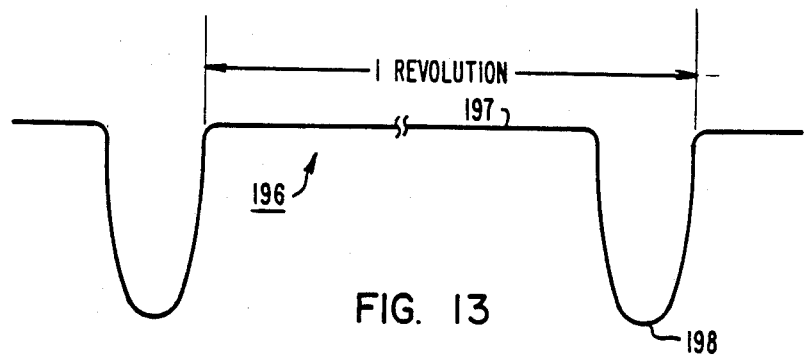
FIG. 13 is a waveform generated by a sensor used to determine axial movement of the turbine rotor.

Detection of rotor axial movement, in one embodiment, is accomplished by the axial sensor S5 illustrated in FIGS. 1 and 2. If the disc surface opposite sensor S5 has no varying features, then the sensor would just provide a constant output signal. Since distances are measured herein by examining waveform peak-to-peak distances, a signal notch may be made in the disc so that the sensor will provide a detected output signal as illustrated by waveform 196 of FIG. 13. For most of the rotation of the disc during one revolution, waveform 196 will have a substantially horizontal portion 197 followed by a negative peak portion 198 caused by the notch. Signal processing of the waveform 196 would be substantially similar to that already described for the remaining sensors; however, since the negative peaks 198 are well defined, the peak detectors would operate to provide the negative peak signal which would then be used in the generation of corrective signals as previously described.

Figure 14:
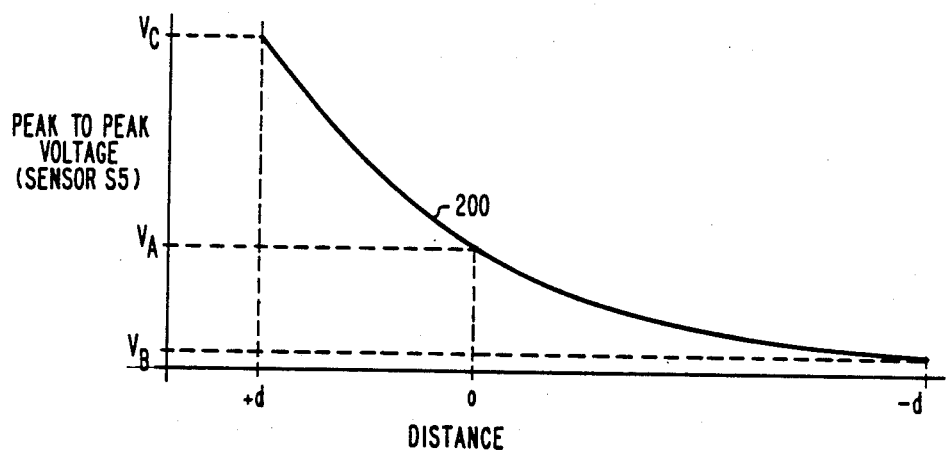
FIG. 14 is a curve illustrating the relationship between certain measured voltages and distance for the sensor which measures axial displacement.

Curve 200 of FIG. 14 shows the typical relation between the axial sensor peak-to-peak voltage plotted on the vertical scale with respect to axial distance plotted on the horizontal scale. With additional reference to FIGS. 12A through 12C, a peak-to-peak voltage of value $V_A$ indicates an axial distance in which the sensors such as S1 are positioned directly over the reference position as in FIG. 12A. A lower peak-to-peak voltage of value $V_B$ may indicate a displacement equivalent to −d to bring the sensor into a position as illustrated in FIG. 12C, whereas the higher value peak-to-peak voltage $V_C$ indicates an axial movement of +d bringing the sensor into the position illustrated in FIG. 12D.

The values for curve 200 may be derived experimentally prior to turbine use by physically moving sensor S5 relative to the disc by known distances and recording the peak-to-peak values derived during such movement. The values may then be stored in the microcomputer memory or once having generated a curve such as 200, the mathematical equation defining such curve could be utilized to derive distance values from corresponding peak-to-peak voltages.

Figure 15:
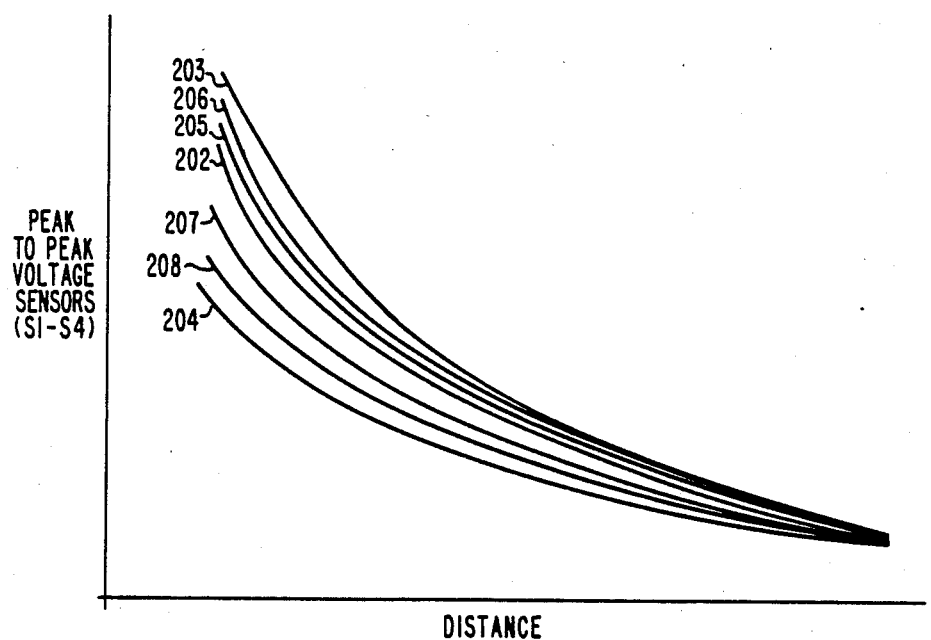
FIG. 15 illustrates a plurality of voltage-distance relationships for the remaining distance measuring sensors.

In a similar fashion, a plurality of peak-to-peak voltage versus distance curves are generated for sensors S1 to S4 corresponding to the sensor's location relative to the reference position at the turbine blade tip as discussed with respect to FIGS. 12A through 12C. More particularly, curve 202 in FIG. 15 represents the peak-to-peak voltage-distance relationship when the sensor is at the zero reference position while curves 203 and 204 represent the relationship at the two displacement extremes +d and −d, respectively. FIG. 15 additionally shows other typical relationships with curves 205 and 206 representing displacement of $+\frac{1}{3}d$, and $+\frac{2}{3}d$, respectively while curves 207 and 208 represent the relationship for displacement of $-\frac{1}{3}d$ and $-\frac{2}{3}d$, respectively.

The values of typical curves such as illustrated in FIG. 15 may be placed into the memory of the microcomputer or alternatively, the mathematical equations describing the curves may be utilized. In operation, if the axial distance is determined to be exactly at the reference position, then curve 202 is utilized to generate a sensor to blade tip distance in response to a peak-to-peak voltage. If the sensor is, for example, at an extreme of −d, then curve 204 would be utilized to generate the distance values. In general, if the sensor is at a location which has a corresponding curve entered into the computer memory, then the values may be taken from the curve. If the sensor displacement is at a position intermediate those defined by the stored curves, then a simple interpolation may be performed to get an output distance reading, or alternatively, the closest curve values may be utilized and still yield acceptable accuracy.

Figure 16:
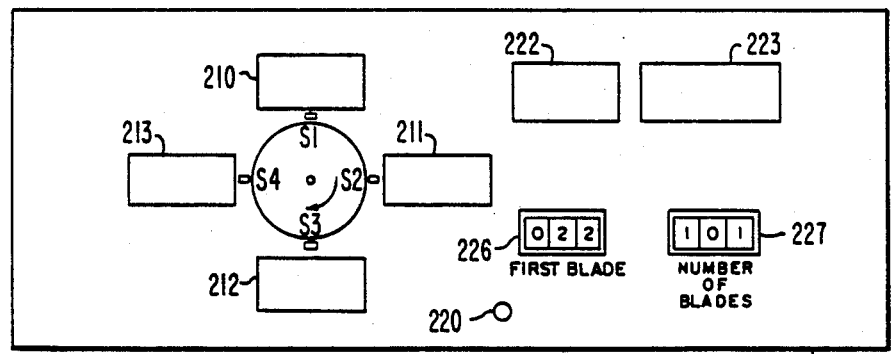
FIG. 16 illustrates the display of FIG. 1 in somewhat more detail.

Once the computer has determined a sensor-to-blade tip distance for each blade and for each sensor, the results may be provided to the display apparatus 16, one example of which is illustrated in FIG. 16. Display 16 includes a plurality of readouts 210 to 213 which may be of the LCD or LED variety, by way of example, for displaying distances derived from the sensor readings. Since the radial sensors are actually positioned within cavities in the flow guide, an appropriate offset may be subtracted from the computed distances such that readouts 210 to 213 display blade tip to flow guide distance at the respective locations of sensors S1 to S4. Alternatively curves 202 to 208 may be generated taking the offset into account.

Readout 210 is operable to display the results utilizing either sensor S1 or the redundant sensor S1', the selection of which may be manually effected by operation of switch 220.

Two additional readouts 222 and 223 are provided for respectively displaying the computed axial position and turbine speed in RPM.

During operation of the monitoring system, the microcomputer keeps track of the position of the blades and in addition computes blade tip distance for each of the blades. If there are N blades in the blade ring, an operator can arbitrarily designate any one of the N blades as blade number 1, with this selection being accomplished with the provision of thumbwheel switch 226 into which the operator would dial any number between 1 and N to designate the first blade. In one mode of operation, the average distance of M blades (where M is any number between 1 and N) may be calculated and displayed. The selection of the number M is accomplished with thumbwheel switch 227. That is to say, if thumbwheel switch 227 is set at 1, then readouts 210 to 213 will display individual blade tip distances of the blade designated by thumbwheel switch 226. If thumbwheel switch 227 is set at 2, then the readouts will display the average distance of the selected first blade plus the next blade following it in rotation. If the number 3 is dialed into thumbwheel switch 227, then the average distance of the selected first blade plus the next two blades in rotation will be displayed, etc. and if N is selected on the switch 227, then the readouts will provide an average distance of all the blades in the blade row at the respective four locations.

The display of FIG. 16 illustrates one elemental means by which the calculated information may be presented to an operator. Other types of displays may be utilized such as operator interactive CRT terminals which may be dedicated to the turbine blade monitoring or which may be a part of a larger overall turbine diagnostic system. The apparatus of the present invention generates certain data by which flow guide distortion or ovality may be determined. In addition, analysis of the detected sensor signals and the calculated distance data over a period of time will yield information relative to other diagnostic measurements such as blade vibration and shaft vibration, by way of example.

We claim:

1. Apparatus for measuring the distance between a blade in a rotating row of blades and a reference position comprising:
   (A) sensor means located at said reference position and operable to provide an output signal indicative of blade proximity;
   (B) said output signal including positive and negative peak portions as a result of the passage of said blade past said sensor;
   (C) means responsive to said output signal for obtaining an indication of the positive to negative peak-to-peak value of said output signal;
   (D) means responsive to said indication for obtaining a signal indicative of said peak-to-peak value; and
   (E) means responsive to said signal indicative of said peak-to-peak value for providing an indication of said distance.

2. Apparatus according to claim 1 wherein:
   (A) said output signal includes cyclical positive and negative peak portions as a result of the passage of said blades of said row, past said sensor means; and which includes
   (B) means for obtaining an average value of two successive peaks of the same polarity and subtracting therefrom the value of the intervening peak of opposite polarity, to obtain a peak-to-peak value.

3. Apparatus according to claim 1 wherein:
   (A) said blade row is subject to movement perpendicular to the general plane of said blade row; and which includes
   (B) means for modifying said peak-to-peak value as a function of any said movement.

4. Apparatus according to claim 1 which includes:
   (A) a plurality of said sensors disposed about said blade row.

5. Apparatus according to claim 4 wherein:
   (A) said blades are steam turbine blades surrounded by a steam flow guide; and
   (B) said sensors being disposed within said flow guide.

* * * * *